United States Patent [19]

Marschall

[11] Patent Number: 5,189,589
[45] Date of Patent: Feb. 23, 1993

[54] POWER CONTROLLER

[75] Inventor: Klaus W. Marschall, Meersburg, Fed. Rep. of Germany

[73] Assignee: Bodenseewerk Gerätetechnik GmbH, Fed. Rep. of Germany

[21] Appl. No.: 477,253

[22] Filed: Feb. 7, 1990

[30] Foreign Application Priority Data

Sep. 25, 1989 [DE] Fed. Rep. of Germany ....... 3931921

[51] Int. Cl.$^5$ ............................................. H02H 3/08
[52] U.S. Cl. ........................................ 361/93; 361/91; 361/98; 361/111; 307/300; 307/350; 307/360
[58] Field of Search .................... 361/41, 93, 98, 111; 307/300, 350, 360

[56] References Cited

U.S. PATENT DOCUMENTS 4,611,154 9/1986 Lambropoulos et al. ........... 318/490
4,631,474 12/1986 Dolland ............................. 324/73 R
(List continued on next page.)

FOREIGN PATENT DOCUMENTS 0133969  3/1985  European Pat. Off. .
8607510 12/1986  European Pat. Off. ............... 361/91
2818067C2 8/1979 Fed. Rep. of Germany .
3008478A1 12/1980 Fed. Rep. of Germany .
(List continued on next page.)

OTHER PUBLICATIONS

"Voltage level sensor" in Electronic Engineering (1973) 16.
"Einchip-μC erkennt Schwellwerte und Nulldurchgänge" in Elecktronik 9/2.5 (1986) 101–104; R. Birchel, N. Meyer, H. Tendyck.
(List continued on next page.)

Primary Examiner—Steven L. Stephan
Assistant Examiner—Thomas M. Dougherty
Attorney, Agent, or Firm—Lee, Mann, Smith, McWilliams, Sweeney & Ohlson

[57] ABSTRACT

To establish an inexpensive, and universally applicable power controller for the monitored activation, monitoring and protection of current-consuming loads by a microprocessor having low-power control outputs, the following circuit elements are implemented in an integrated device: an activation path (12) disconnectable by an electronic switch (18) and to which a C-MOS/TTL-signal is adapted to be applied by a microprocessor output port and which generates a MOS-FET control signal; a latch (20) which is arranged to control said electronic switch (18) and which, for its part, is adapted to be controled by external C-MOS/TTL-signals such that the switch (18) opens with a first signal and closes with a second signal; a current comparator (40) offering a first and a second switching threshold adapted to be determined by external components and a third fixed internal switching threshold and to which the load current is adapted to be applied common mode rejected and which are arranged to control the latch (20) to open the electronic switch (18) with a delay determined by external components (54,56) when the second (42) lower switching threshold of the current comparator (40) is exceeded, and undelayed when the third higher switching threshold of the current comparator (40) is exceeded; a status indicator (72) for the latch (20) for indication of the state "overcurrent"; a load voltage measuring path (68) having a signal output (70) which is arranged to signal load voltage within tolerance; a first load current measuring path, the load current input (34,36) of which is connected to the current comparator (40) having, a signal output (48) which is arranged to signalize the load current within tolerance; a second load current measuring path (60) having an analog voltage output (62,64) adapted to be calibrated according to the current and to be applied to an A/D-converter (100) of a microprocessor (90); a reset circuit (112) which definedly sets the latch (20) when the device (10) is powered; and a test circuit (86,96) which is arranged to be supplied by analog input voltages from a D/A-converter of the microprocessor (90) connected to the current measuring paths (40) for simulation of load currents.

1 Claim, 2 Drawing Sheets

U.S. PATENT DOCUMENTS

| | | | |
|---|---|---|---|
| 4,663,537 | 5/1987 | Gölner et al. | 307/10 R |
| 4,748,348 | 5/1988 | Thong | 307/360 |
| 4,787,007 | 11/1988 | Matsumura et al. | 361/91 |
| 4,926,288 | 5/1990 | Bradley | 361/98 |
| 5,008,586 | 3/1991 | Miyashi et al. | 361/93 |

FOREIGN PATENT DOCUMENTS

| | | | |
|---|---|---|---|
| 3338764 | 5/1985 | Fed. Rep. of Germany | 361/93 |
| 3638933A1 | 5/1987 | Fed. Rep. of Germany | |
| 3710880A1 | 10/1987 | Fed. Rep. of Germany | |
| 3616975A1 | 11/1987 | Fed. Rep. of Germany | |
| WO87/07388 | 12/1987 | Fed. Rep. of Germany | |
| 3623755A1 | 2/1988 | Fed. Rep. of Germany | |
| 3807305A1 | 7/1988 | Fed. Rep. of Germany | |
| 3733088A1 | 4/1989 | Fed. Rep. of Germany | |
| 3841491A1 | 7/1989 | Fed. Rep. of Germany | |
| 0008820 | 1/1989 | Japan | 307/350 |
| 2208193 | 3/1989 | United Kingdom | 361/93 |

OTHER PUBLICATIONS

EP 90 117559-European Search Report.

German Search Report.

"Strom und Spannung, wie gewünscht, Mikroprozessor regelt netzgeführten Stromrichter" in elektronikpraxis (1984), 150–154.

"Intelligente" Leistungshalbleiter-Funktion und Anwendung in der elektroniker (1989), 33–38.

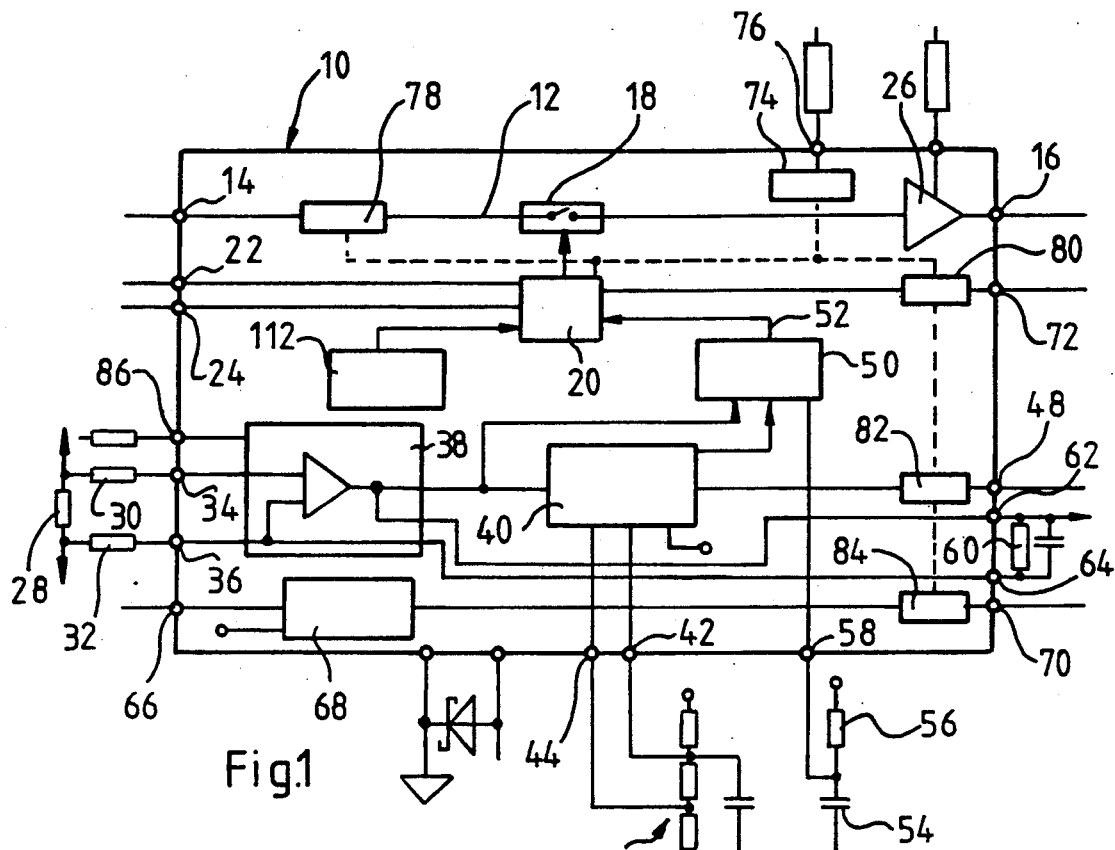
Fig.1
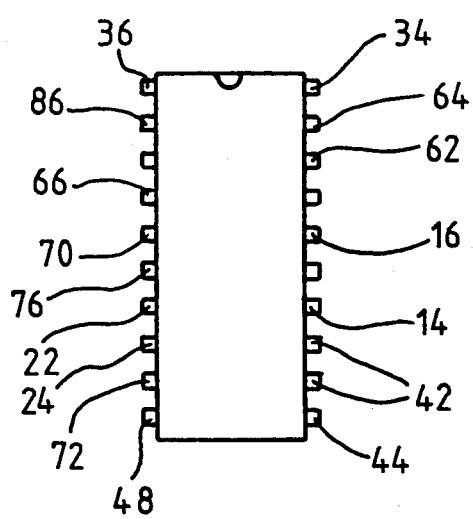
Fig.2
| $\overline{DA}$ | $\overline{RS}$ | CD | LD |
|---|---|---|---|
| H | H | L | L |
| H | H | X | H |
| ↓ | ↓ | H | L |
| H | H | L | H |
| H | H | L | L |
| L | L | | |
| | | | forbidden |
Fig.3

POWER CONTROLLER

TECHNICAL FIELD

The invention relates to a power controller for the monitored activation, monitoring and protection of current-consuming loads by a microprocessor having lowpower control outputs.

The loads can be, for example, solenoid switching coils, stepper motor coils, relays or lamps. These loads are energized from an external voltage. They will be activated by a microprocessor.

BACKGROUND ART

Power driver devices are commercially available. These known devices are mostly designed for a certain application in certain surroundings. Thus, they are not adapted to be used in a flexible manner. Furthermore, the possibility to either monitor or protect the load is lacking in the known devices. The possibility to test the devices by a microprocessor is lacking in all of the known devices.

In the known devices the current switching transistor is located inside of the device. This also leads to a restriction in the applicability. Then, for a certain application, generally the power driving capability is made either too low or too high. In the latter case, the package is mostly too large for application purpose. Due to the implementation of the current switching transistor with its power driving capability, the allowed range of the operating temperature of the device is often too low.

DISCLOSURE OF INVENTION

It is the object of the invention to simplify the activation, monitoring and protection of current-consuming loads.

Furthermore, it shall be easy to test the power controller itself. The power controller shall be adapted to be used flexibly and for very different loads. The allowed temperature range shall be extended with regard to the prior art.

According to the invention this object is achieved in that the following circuit elements are implemented in an integrated device:

(a) an activation path disconnectable by an electronic switch and to which a C-MOS/TTL-signal is adapted to be applied by a microprocessor output port and which generates a MOS-FET control signal, (b) a latch which is arranged to control said electronic switch and which, for its part, is adapted to be controled by external C-MOS/TTL-signals such that the switch opens with a first signal and closes with a second signal, (c) a current comparator offering a first and a second switching threshold adapted to be determined by external components and a third fixed internal switching threshold and to which the load current is adapted to be applied common mode rejected and which are arranged to control the latch to open the electronic switch
   with a delay determined by external components when the second lower switching threshold of the current comparator is exceeded, and
   undelayed when the third higher switching threshold of the current comparator is exceeded, (d) a status indicator for the latch for indication of the state "overcurrent", (e) a load voltage measuring path having a signal output which is indicative of whether the load voltage is within a pre-determined tolerance, (f) a first load current measuring path, the load current input of which is connected to the current comparator, having a signal output which is indicative of whether a load current is within a pre-determined tolerance, (g) a second load current measuring path having an analog voltage output adapted to be calibrated according to the current and to be applied to an A/D-converter of a microprocessor, (h) a reset circuit which sets the latch when the device is switched on, and (i) a test circuit which is arranged to be supplied by analog input voltages from a D/A-converter of the microprocessor connected to the current measuring paths for simulation of load currents. An embodiment of the invention will now be described in greater detail with reference to the accompanying drawings.

BRIEF DESCRIPTION OF THE DRAWINGS

FIG. 1 is a block diagram of a power controller realized as a device.

FIG. 2 shows the pinout of the device according to FIG. 1.

FIG. 3 shows the logical gating of inputs and outputs of the power controller according to FIG. 1.

PREFERRED EMBODIMENTS OF THE INVENTION

Figure 4:
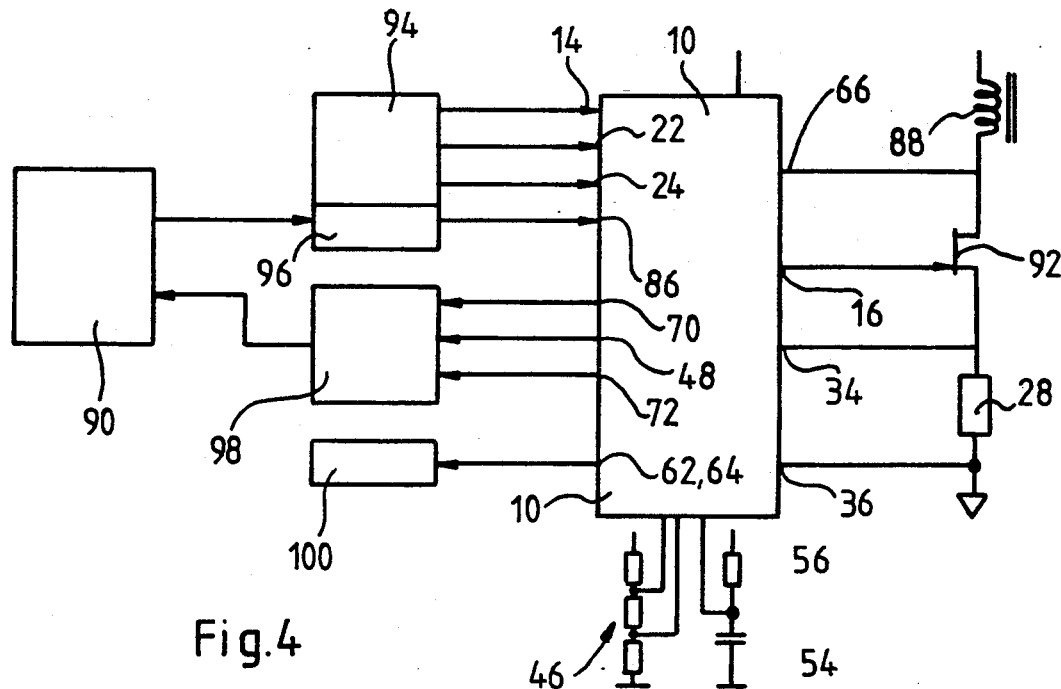
FIG. 4 shows the circuit of the power controller according to FIG. 1 in connection with a microprocessor and a load in a "low driver" application.

Numeral 10 designates a power controller realized as a device. The thickly drawn border indicates the device. The circles located on the border symbolize the pins of the device.

An activation path 12 extends from a pin 14 of the device 10 to a pin 16. The activation path 12 comprises an electronic switch 18 which is illustrated as switch contact in FIG. 1. The switch 18 is controlled by a latch 20. In a first state the latch 20 controls the switch 18 to be opened, that means non-conductive. In a second state the latch 20 controls the switch 18 to be closed, that means conductive.

The latch 20 can also be set to the first state by an external signal DA (disable) at an input 22 of the device 10. By an external signal RS (reset) at an input 24 of the device 10 the latch 20 can be reset to the second state in which the switch 18 is closed.

Furthermore, the activation path 12 comprises an amplifier 26 which generates a signal at the output 16 for controlling a MOS-FET.

A voltage, proportional to the load current in a load circuit drops across a measuring resistor 28. The voltage drop across the measuring resistor 28 is applied through the resistors 30 and 32 to the inputs 34 and 36 of the device 10. The inputs 34 and 36 are connected to the inputs of a current differential amplifier 38. Thereby, a common mode rejected current is generated for a current comparator 40. The current comparator 40 receives a first threshold value S2 from an input 44 of the device 10, a second threshold value S1 from an input 42 and a third threshold value from an internal reference (10 volts). The threshold values S1 and S2 are externally generated by a voltage divider 46.

When the current at the output of the current differential amplifier 38 is below the first threshold value S2, the current comparator 40 lets the state of the latch 20 be unchanged; the output 48, however, reports "undercurrent" (e.g. wire rupture).

When the current of the current differential amplifier 38 is between the first and the second threshold value, the current comparator 40 likewise lets the state of the latch 20 be unchanged; the output 48 indicates the current to be within tolerance.

When the current of the current differential amplifier 38 is between the second threshold S1 and the third threshold (10 V), an overcurrent comparator 50 will be activated. Through a line S2 the current comparator 40 and the overcurrent comparator 50 set the latch 20 which causes the switch 18 to open with delay. The delay is determined by an external RC-network having the capacitor 54 and a resistor 56 which are applied to a supply voltage. The voltage of the capacitor 54 is applied to the overcurrent comparator 50 through an input 58 of the device 10.

When the current of the current differential amplifier is above the third threshold (10 volts), the latch 20 is set and the switch 18 is opened undelayed (e.g. short circuit).

An analog voltage proportional to the current drops across an external resistor 60. This resistor is connected to the outputs 62 and 64 of the device 10. The outputs 62 and 64 are connected to the current differential amplifier 38.

The voltage of the load is applied to an input 66 of the device 10. This voltage is compared with a reference voltage by a voltage comparator 68. When the voltage at the input 66 is lower than the reference voltage, an output signal occurs at an output 70. This output signal indicates that the voltage at the load is within tolerance.

The state of the latch 20 is indicated at an output 72 of the device 10.

The output signals are usual TTL-voltages. The output voltages are kept at the TTL-level by means of buffer circuits 78, 80, 82 and 84 by a TTL-reference 74 which is connected to the supply voltage of +5 volts through an input 76.

A voltage can be applied to an input 86 for test purposes. Thus, by the simulation of the load currents by the microprocessor, a test of the device 10 itself can be effected.

The device with its pins is illustrated in plan view in FIG. 2.

FIG. 3 is a truth table and shows the correlation between the input signals at the inputs 22 and 24 which controls the latch 20, and the correlation between the input signal at the input 14 and the output signal at the output 16.

FIG. 4 shows the circuit of the device 10 in connection with a load 88 and a microprocessor 90 with the device being configured as "low driver", i.e. the "cold" side of the load 88 being switched.

A MOS-FET 92 and the measuring resistor 28 are connected in series with the load 88, with the load being connected to a supply voltage of 28 volts and the end of the measuring resistor 28 being connected to earth. The gate of the MOS-FET 92 is connected to the output 16 of the activation path 12.

The microprocessor 90 has a block 'output port' 94 through which it can apply, for example, activation signals to the input 14, a disable signal to the input 22 and a reset signal to the input 24 of the device 10. Through a D/A-converter 96 the microprocessor 90 supplies currents to the input 86 for test purposes. Furthermore, the microprocessor has an input port 98. Through the input port 98 the microprocessor 90 receives information about voltage, current and overcurrent from the outputs 70, 48 and 72 of the device 10. A current, flowing in the current differential amplifier 38 and generating a voltage drop across the resistor 60 is converted by an A/D-converter 100 into a digital word which likewise is supplied to the microprocessor 90.

Figure 5:
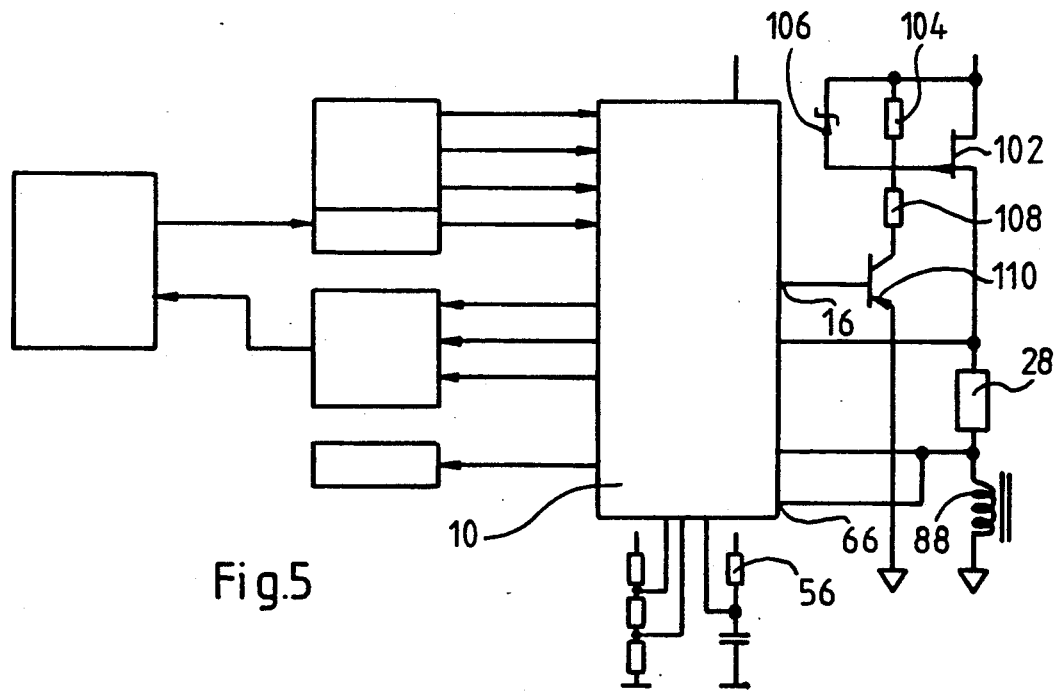
FIG. 5 shows the circuit of the power controller according to FIG. 1 in connection with a microprocessor and a load in a "high driver" application.

In FIG. 5 the connection to the microprocessor is the same as in FIG. 4 and therefore not described once again.

Here, the device 10 is configured as "high driver". Through the device 10 the "hot" side of the load is switched. In the load circuit a MOS-FET 102, the measuring resistor 28 and the load 88 are connected in series to the supply voltage of 28 volts. The other end of the load is connected to earth. Furthermore, a resistor 104 having a voltage limiter 106, a resistor 108 and the collector-emitter-junction of a transistor 110 are connected in series from earth to the supply voltage. The base contact of the transistor is connected to the output 16 of the device 10.

The described power controller operates as follows:

For activation of a load 88 the microprocessor applies an activation signal through its output port 94 to the device 10, i.e. a command to switch on the load 88. This is effected through an external driving transistor in the form of a MOS-FET 92 and 102, respectively. The MOS-FET 92 or 102 switches on the current in the load circuit which is supplied with 28 volts by a separate voltage source. The activation of the load 88 can be effected by a device 10 configured as "low driver" as illustrated in FIG. 4, or, as illustrated in FIG. 5, by a device 10 which is configured as "high driver". In the latter case the MOS-FET 102 -s activated through a stage with the transistor 110. The output 16 is applied to the base contact of the transistor 110.

The device is able to monitor the load 88. The measuring resistor 28 is located in the load circuit. The resistance value of the measuring resistor 28 is in the magnitude order of 100 milliohm. The voltage measured at the measuring resistor 28 indicates the load current. This voltage is supplied to the current differential amplifier 38 through the inputs 34 and 36. The current measurement is supplied to the A/D-converter 100 of the microprocessor through the outputs 62 and 64 with the resistor 60. Thus, the microprocessor 90 can recognize the actual present load current independently of the information obtained through the threshold values $S_1$ and $S_2$.

The two threshold values $S_1$ and $S_2$ are determined by the voltage divider 46. Below the lower threshold $S_2$ the output 48 is activated and indicates that the load current is below the allowed range. Between the two thresholds $S_1$ and $S_2$ the output 48 indicates that the load current is within tolerance limits. Above the threshold $S_1$ the output 48 signals overcurrent after the latch 20 has disconnected the activation path with the switch 18 after a delay time has elapsed. Due to the disconnection the MOS-FET 92 or 102 will be disactivated. The MOS-FET 92 or 102 becomes non-conductive and the current through the load 88 is interrupted. Above the third threshold (10 volts) this interruption is effected without delay. Numeral 112 designates a reset circuit which sets the latch 20 when the device 10 is switched on such that, for example, the switch 18 is in the open position.

In case of overcurrent or short circuit (the exceeding of a second or third threshold of the load current), the load current is switched off in the described way through the latch 20, the switch 18 and the MOS-FET 92 and 102, respectively. The same effect is achieved by a disable signal at the input 22. This disable signal can be supplied by the microprocessor 90 through a (not illustrated) second output port, by another microprocessor, by a monitoring circuit (watch-dog) monitoring the microprocessor or by some other monitoring circuit, e.g. an overspeed recognition circuit. After the latch 20 has been released, it can be reset by a reset signal at the input 24 to its initial state in which it closes the switch 18.

In order to test the power controller, the circuit elements for the activation through the input 14, and the circuit elements for the monitoring and protection of the load can be activated through the input 86.

Then, the microprocessor 90 supplies a voltage through the D/A-converter 96 to the device 10, which voltage generates a current in the input 86 through a resistor. The current is added by the current differential amplifier to the current measured in the load circuit. Thus, the different overcurrent releases, overcurrent indications and other switching processes occurring at overcurrent can be released.

Here, it is not necessary to monitor the device 10 with regard to over-temperature because the load current does not flow through the device 10. Due to the described construction a universally applicable device is achieved. Due to the fact that the parameters such as switching thresholds, delay time and calibration of the current measurement are programmed by external resistors and that also the MOS-FET is not an integral part of the device, the device can be used under the most varied conditions. On the other hand, it integrates expensive discrete components in a small, inexpensive and reliable device.

The device 10 is realized as ASIC in 3$\mu$-bipolar technology.

I claim:

1. Power controller for the monitored activation, monitoring and protection of current-consuming loads in a load circuit by a microprocessor having low-power control outputs, characterized in that the following circuit elements are integrated in an integrated device:

(a) an activation path (12) disconnectable by an electronic switch (18) and to which either a CMOS or TTL signal is adapted to be applied by a microprocessor output port and which generates a MOS-FET control signal, (b) a latch (20) which is arranged to control said electronic switch (18) and which, for its part, is adapted to be controlled by external either CMOS or TTL level signals such that the switch (18) opens with a first signal and closes with a second signal, (c) a current comparator (40) offering a first and a second switching threshold adapted to be determined by external components and a third fixed internal switching threshold, and to which the load current is adapted to be applied common mode rejected and which are arranged to control the latch (20) to open the electronic switch (18)

with a delay determined by external components (54,56) when the second lower switching threshold of the current comparator (40) is exceeded, and undelayed when the third higher switching threshold of the current comparator (40) is exceeded, (d) a status indicator (72) for the latch (20) which indicates when the power controller detects a state of overcurrent, (e) a load voltage measuring path (68) having a signal output (70) which is indicative of whether a load voltage is within a predetermined tolerance, (f) a first load current measuring path, the load current input (34,36) of which is connected to the current comparator (40), having a signal output (48) which is indicative at whether the load current is within a predetermined tolerance, (g) a second load current measuring path (60) having an analog voltage output (62,64) adapted to be calibrated according to the current and to be applied to an A/D-converter (100) of a microprocessor (90), (h) a reset circuit (112) which sets the latch (20) to a well-defined state when the device (10) is powered, and (i) a test circuit (86,96) which is arranged to be supplied by analog input voltages form the D/A-converter of the microprocessor (90) connected to the current measuring paths (40) for simulation of load currents.

* * * * *